United States Patent
Dragone

[11] Patent Number: 6,058,233
[45] Date of Patent: May 2, 2000

[54] WAVEGUIDE ARRAY WITH IMPROVED EFFICIENCY FOR WAVELENGTH ROUTERS AND STAR COUPLERS IN INTEGRATED OPTICS

[75] Inventor: Corrado Dragone, Little Silver, N.J.

[73] Assignee: Lucent Technologies Inc., Murray Hill, N.J.

[21] Appl. No.: 09/109,244

[22] Filed: Jun. 30, 1998

[51] Int. Cl.[7] ........................................................ G02B 6/26

[52] U.S. Cl. ................................ 385/46; 385/15; 385/20; 385/21

[58] Field of Search ............................. 385/15–24, 37–46

[56] References Cited

U.S. PATENT DOCUMENTS

| 5,136,671 | 8/1992 | Dragone | 385/46 |
| 5,822,481 | 10/1998 | Mestric | 385/46 |

Primary Examiner—Phan T. H. Palmer

[57] ABSTRACT

An optical interconnection apparatus including waveguide arrays, such as grating routers and star couplers, has reduced coupling loss by reducing the width of the waveguides in the array, where they connect to the free-space region, so that they are smaller than the gaps between adjacent waveguides. The free-space region is formed by a slab whose thickness is tapered in a transition region, where it connects to the waveguide arrays, so as to essentially eliminate any mismatch loss that would otherwise be caused in an abrupt junction of the waveguide arrays with the free-space region.

19 Claims, 11 Drawing Sheets

WAVEGUIDE ARRAY WITH IMPROVED EFFICIENCY FOR WAVELENGTH ROUTERS AND STAR COUPLERS IN INTEGRATED OPTICS

TECHNICAL FIELD OF THE INVENTION

This invention relates to optical waveguide arrays and, more particularly, to optical waveguide arrays having improved efficiency for wavelength routers and star couplers in integrated optics.

BACKGROUND OF THE INVENTION

Figure 1:
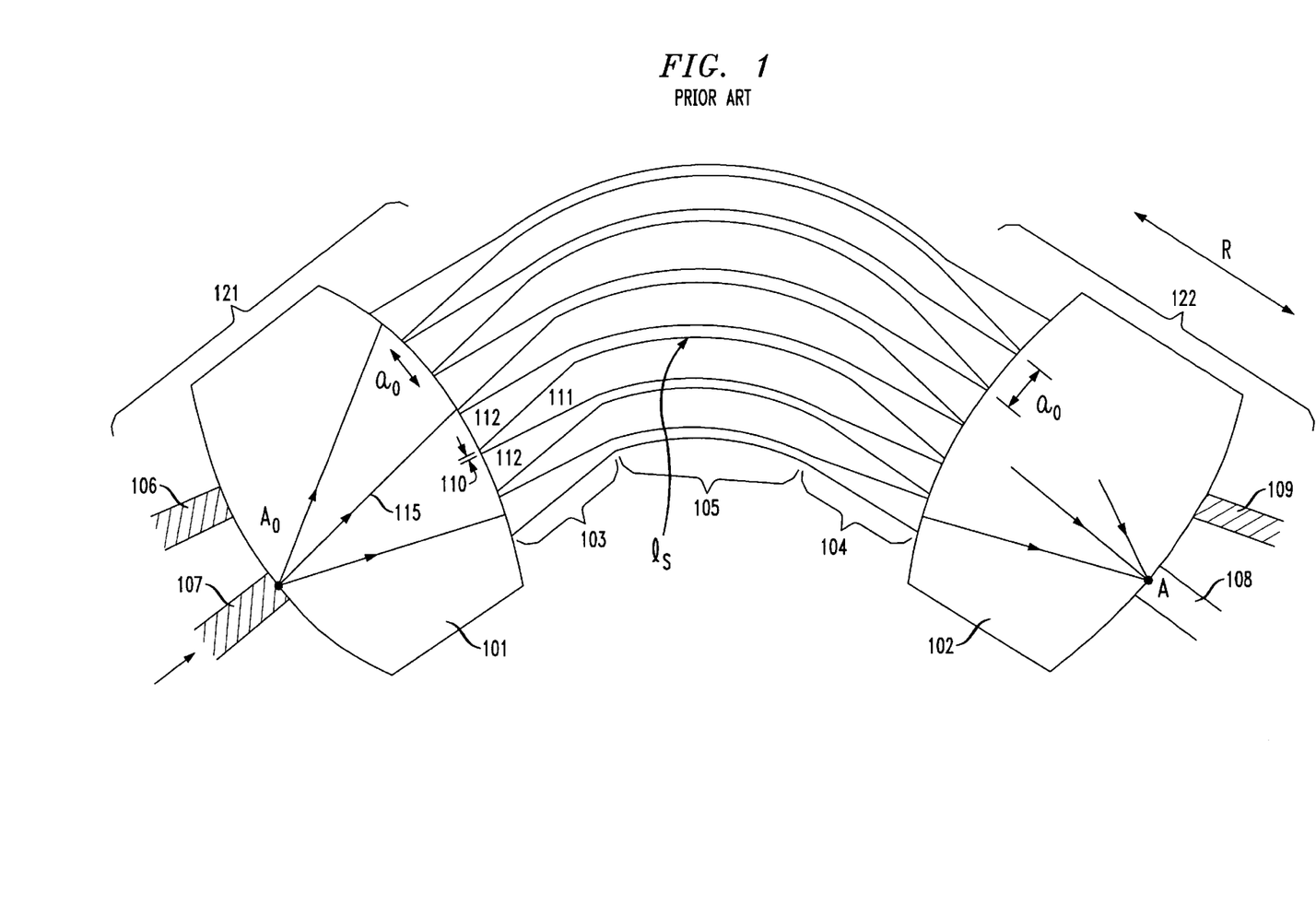
FIG. 1 shows an illustrative configuration of a prior art waveguide grating router.

Optical waveguide arrays are used as routers and star couplers in optical communication systems. In integrated optics, a wavelength grating router can be realized efficiently by using a generalized Mach-Zehnder arrangement of many arms. One such wavelength grating router is described in my U.S. Pat. No. 5,136,671, issued on Aug. 4, 1992. As shown in FIG. 1, this router arrangement is generally symmetric and it is composed of two dielectric slabs, 101 and 102, two periodic arrays 103 and 104, and a set of waveguides (grating arms), 105, of different lengths between the two arrays. Typically, in commercial router array devices, the loss exceeds 5 dB for the central ports of the router and, for the marginal ports, it often exceeds 9 dB. Such losses seriously limit the usefulness of the router for passive networks and applications such as channel dropping filters with stringent requirements on loss uniformity. It is generally important to improve uniformity, by reducing the difference between maximum and minimum loss. The above loss variation is primarily caused by the waveguide grating. It is caused by scattering at the two junctions where the grating arms connect to the input and output slabs. Efficient router arrays are currently realized by means of adiabatic transitions that are generally difficult to realize, because they require very small gaps, 110, between adjacent waveguides. Theoretically, scattering at the two junctions can be reduced by reducing the gaps between adjacent cores in the vicinity of each junction. However, this approach generally results in higher crosstalk, because of nonuniform filling by the top cladding in the regions between the waveguide cores. Another approach, that is often used to improve efficiency, is to reduce the waveguides contrast, but this has the disadvantage of increasing the device dimensions, since it requires smaller curvatures in the bends of the arms.

Thus there is a continuing need to reduce the loss of such waveguide grating routers and star couplers.

SUMMARY OF THE INVENTION

The present invention reduces the loss of optical interconnection apparatuses using waveguide arrays, such as grating routers and star couplers, without incurring the two problems exhibited using prior art approaches. In accordance with the present invention, instead of reducing the gaps, as in the prior art, the gaps are increased and the array waveguides widths are reduced in the vicinity of each junction of the waveguide arrays with the free-space region (also referred to herein as a slab).

More particularly an optical interconnection apparatus and method of making the same are disclosed as comprising a free-space region having an input side and an output side, where at least one input waveguide is radially connected to the input side of the free-space region and directs optical signals to a plurality of output waveguides radially connected, at a junction, to the output side of the free-space region. A transition region, extending radially from the junction along said plurality of output waveguides has a coupling efficiency between said free-space region and said plurality of output waveguides which is maximized by reducing the width of the plurality of output waveguides in the transition region close to the junction in such a way that the width, w, at the junction is smaller than the gaps, t, between adjacent ones of the plurality of output waveguides.

One feature includes minimizing the width, w, by choosing the smallest value allowed by a fabrication process used to form said apparatus and a specified maximum loss for said apparatus. According to another feature the width, w, is selected so as to reduce the array receiving (or transmitting) efficiency variation over the array field of view, so as to satisfy a specified tolerance on the maximum loss variation between the marginal and central ports of the router, while maintaining a predetermined loss value for the apparatus. Yet another feature establishes a ratio of the width, w, to the thickness, h, of the output waveguides which is less than one. According to another feature, the free-space region and its vicinity include an additional core layer of tapered thickness forming an improved transition region between the array and the free-space region.

DETAILED DESCRIPTION

In the following description, each item or block of each figure has a reference designation associated therewith, the first number of which refers to the figure in which that item is first described (e.g., 101 is first described in FIG. 1). Additionally, when the following description refers to a prior article or patent that reference is identified in brackets e.g., [2] indicating the position of that reference in the reference list of the Appendix.

Shown in FIG. 1 is an illustrative configuration of a prior art waveguide grating router implemented in integrated optics. In integrated optics, a wavelength router can be realized efficiently as described in my above-identified U.S. Pat. No. 5,136,671, issued on Aug. 4, 1992, reference [1], which is incorporated by reference herein. FIG. 1 shows an improved waveguide grating router of the type described in the referenced patent. Such a waveguide grating router is shown implemented by using a generalized Mach-Zehnder arrangement of many arms. This arrangement is generally symmetric, and comprises two dielectric planar slabs, 101 and 102, two periodic arrays, 103 and 104, and a set of waveguides (grating arms), 105, of different lengths, $I_s$, between the two arrays. Each input waveguide, 106 and 107, is connected to the first slab 101, and the input signal $A_0$ radiated from an input waveguide, e.g., 107, is transmitted to the periodic array 103 of receiving apertures, connected to the various arms 105.

A waveguide grating router is also referred to as including an input star coupler e.g., 121, a set of arms 105 and an output star coupler 122. With brief reference to FIG. 5, a star coupler includes a planar slab, e.g., 501, having both a input array 512 (including many input waveguides, e.g., 502) and an output periodic array, 503 of radial waveguides with focal point 530 (the center(0) waveguide position of FIG. 3).

Returning to the waveguide grating router of FIG. 1, each arm 105 has a length, $I_s$, that produces a suitable phase shift to its signal component, which is then radiated by the second array 104 into the second slab 102, and it is finally received by the output waveguides 108 and 109. An important concern for many applications is the coupling loss caused by the two periodic arrays 103 and 104. In each array, this coupling loss is caused by unwanted modes scattered at the junction of the array with the slab. This coupling loss can be reduced by reducing the gap, e.g., 110, between adjacent waveguides and, for a given gap, by reducing the contrast, determined by the effective refractive index difference between the gap material (the cladding), e.g., 111, and the core material, e.g., 112, of the periodic array. In practice however, these gaps 110 cannot be smaller than some minimum value determined by the fabrication process utilized. Typically, using silica cores imbedded in silica, it is difficult to fill (with cladding) gaps 111 smaller than about 2 microns ($\mu$m). Additionally, this approach generally results in higher crosstalk, because of nonuniform filling by the top cladding in the regions 111 between the cores.

Moreover, reducing the contrast to a level where it will significantly reduce the junction loss may not be practical. Contrasts of less than about 0.3% are generally impractical, since they require a more difficult design with reduced curvature in the bends of the arms 105 and, therefore, result in larger waveguide router device dimensions. As a consequence, prior art waveguide routers exhibit substantial coupling loss caused by the coupling of each array to a slab.

The present invention describes a technique for substantially reducing this coupling loss (by increasing coupling efficiency), without using small gaps, and without reducing the contrast in the curved regions of the arms. This second feature is particularly useful when the number of ports is large, and sharp bends are needed to reduce the device dimensions.

Figure 2A:
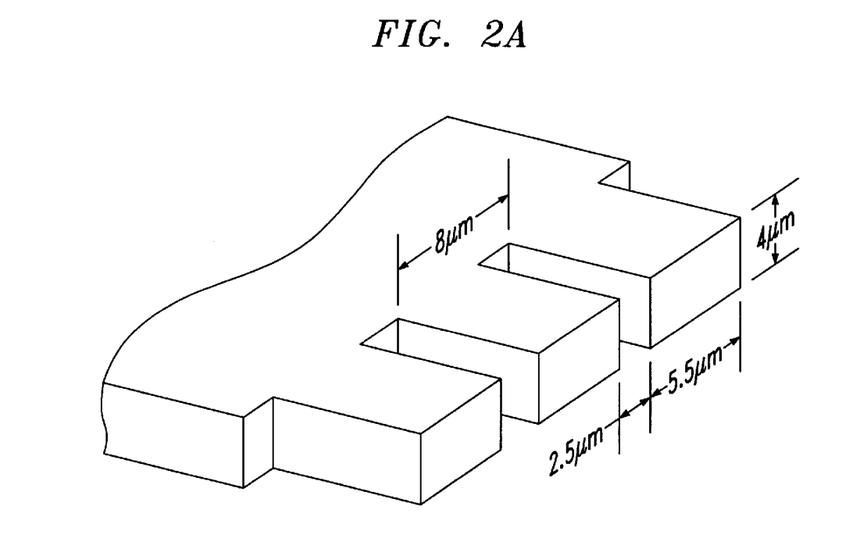
FIG. 2a illustratively shows, for a prior art waveguide grating router, the junction of the periodic array with the slab
Figure 2B:
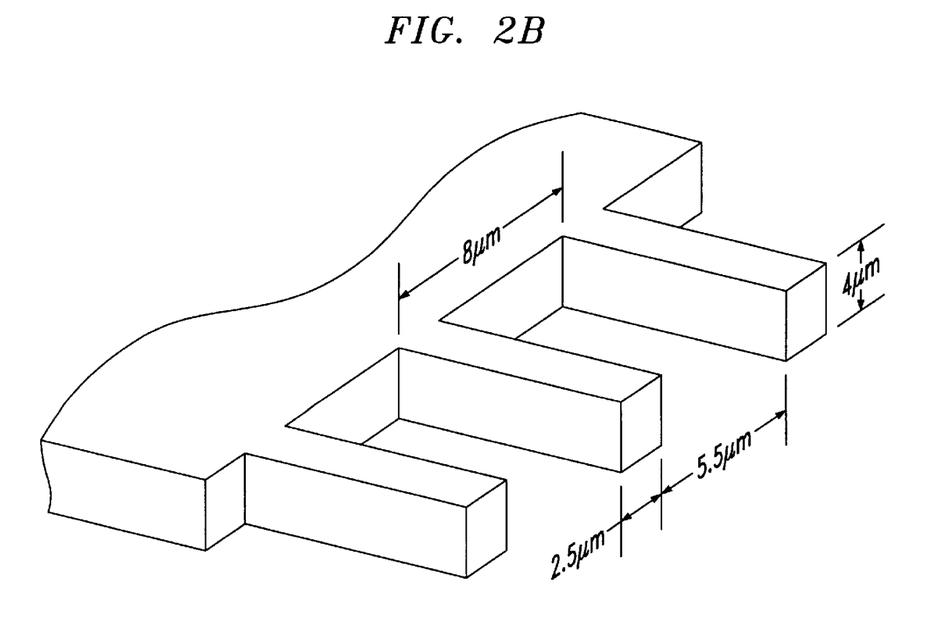
FIG. 2b shows the junction having an increased gap and reduced array waveguides width.

I have recognized that efficiency can be increased by decreasing the width of the waveguides at the junction to the slab, instead of decreasing the gap, as in the prior art. The two technique are illustrated in FIG. 2. In both FIG. 2a and FIG. 2b, the grating consists of 4 $\mu$m silica waveguides imbedded in silica with contrast $\Delta n_0 = 0.65\%$ and spacing of 8 $\mu$m at the junction next to the output slab. In FIG. 2a, the gaps are approximately 2.5 $\mu$m and the array arms are about 5.5 $\mu$m, while in FIG. 2b, the gaps are approximately 5.5 $\mu$m and the array arms are about 2.5 $\mu$m.

Figure 3:
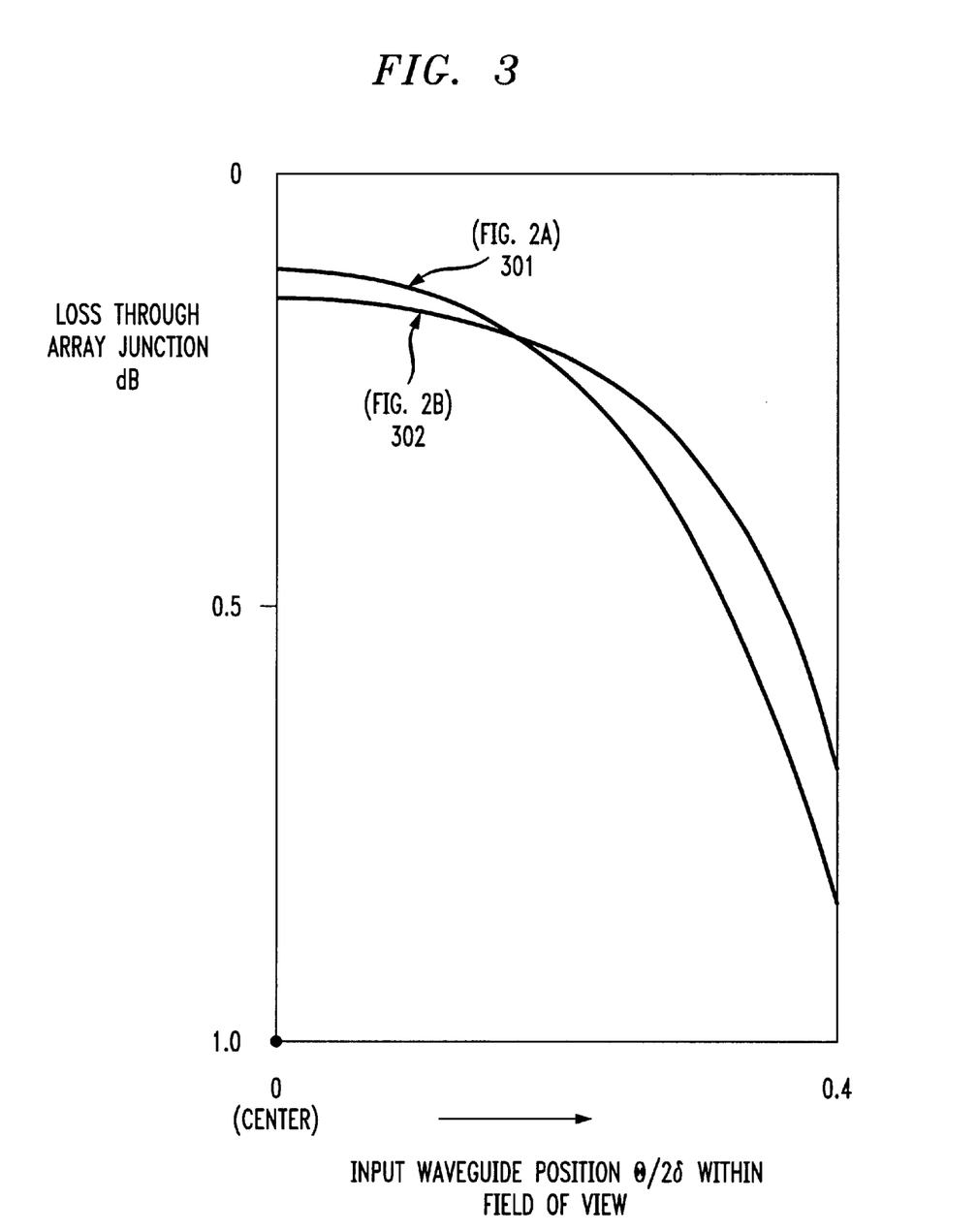
FIG. 3 illustratively shows the loss through an output junction as a function of waveguide position within the field of view of an input waveguide port.

Curves (301, 302) of FIG. 3 show the coupling losses at the junction discontinuity in the two cases, FIGS. 2a and 2b. Each curve gives the loss variation as a function of an input waveguide position within the field of view occupied by the input waveguides. For example with reference to FIG. 5, the input waveguide position determined by the optical signal $A_0$ radiated from input waveguide or port 502 is measured relative to the center 504 of the field of view. Returning to FIG. 2, we see that the loss behavior is substantially improved by the new design 302 (i.e., FIG. 2b). As shown in FIG. 3, the curve 302 (for new design of FIG. 2b) shows a reduced loss variation in the central region of the field of view. The loss variation now remains small, for instance less than 0.5 dB, over a wider region. The improved uniformity is an important feature for applications requiring that the total loss variation be smaller than a specified value. Curve 302 effectively increases the width of the available field of view where the input and output waveguides can be located without exceeding the specified loss. Moreover, since the gaps between waveguides are now much wider, 5.5 $\mu$m, they can be readily filled by the top cladding.

Figure 4A:
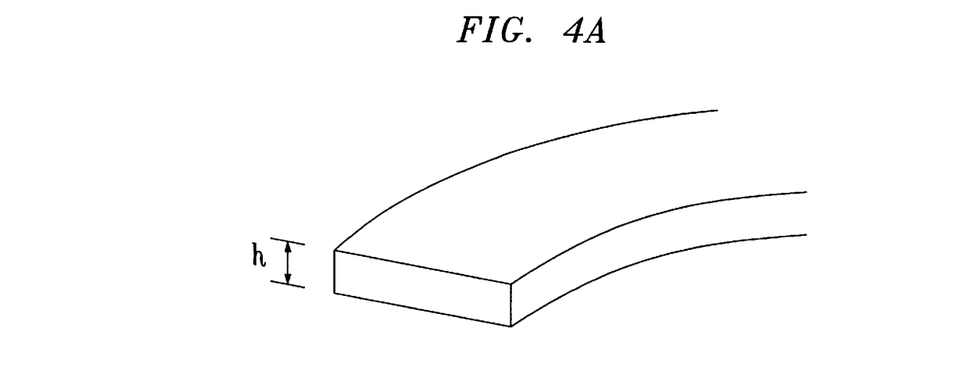
FIG. 4a shows a rectangular core waveguide and FIG. 4b shows rectangular core waveguide formed on a core layer having the same contrast.
Figure 4B:
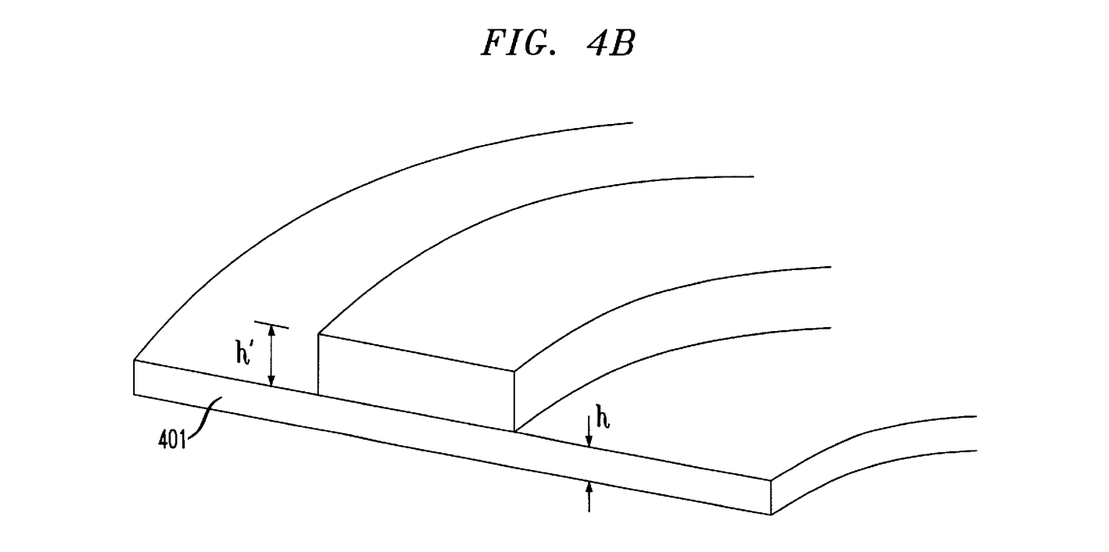

The present invention recognizes that coupling loss can be reduced, without using small gaps, and without reducing the contrast in the curved regions of the arms. To this purpose, we replace the conventional array geometry (of FIGS. 1, 2a) with its dual geometry Is (FIGS. 2b, 8) obtained by increasing, instead of decreasing, the gaps in the transition region close to the array junction. The contrast is also reduced in the transition region by depositing an additional core layer over a transition region (e.g., see 905 of FIG.9). This second aspect of my technique involves reducing the contrast in the junction region by depositing an additional core layer in the transition region. In the following analysis we only consider the problem of reducing the loss of a receiving array, since the same technique applies to a transmitting array. We assume a planar geometry for the array and make use of the effective index analysis method. This method is very accurate when the waveguides are of the type shown in FIG. 6, but it also applies to the geometry of FIGS. 2 and 5. In either case, the array is characterized on a suitable reference plane by an effective refractive index distribution, which can be determined by well known methods [5] by deriving the local properties of the various modes in the plane of the array. These properties are determined by the dimensions and refractive indexes of the various waveguides. In particular, for a slab of variable thickness, the local effective index at any point in the reference plane is determined by the local propagation constant of a slab mode. We denote by $\Delta n$ the effective index difference (contrast) on the reference plane. Typically, $\Delta n$ is appreciably smaller than the actual refractive index difference $\Delta n_0$ between core and cladding. For instance, for a silica waveguide realized as in FIGS. 4a and 5 with $\Delta n_0 = 0.65\%$, the effective waveguide contrast on the array reference plane is close to 0.3%. One can show that the contrast can be reduced for a given $\Delta n_0$ by either reducing the waveguide height h (in FIGS. 4a and 5) or by including a slab below the waveguide as shown by 401 in FIG. 4b and 601 in FIG. 6. The value of $\Delta n$ can be calculated from the waveguide mode behavior.

Figure 5:
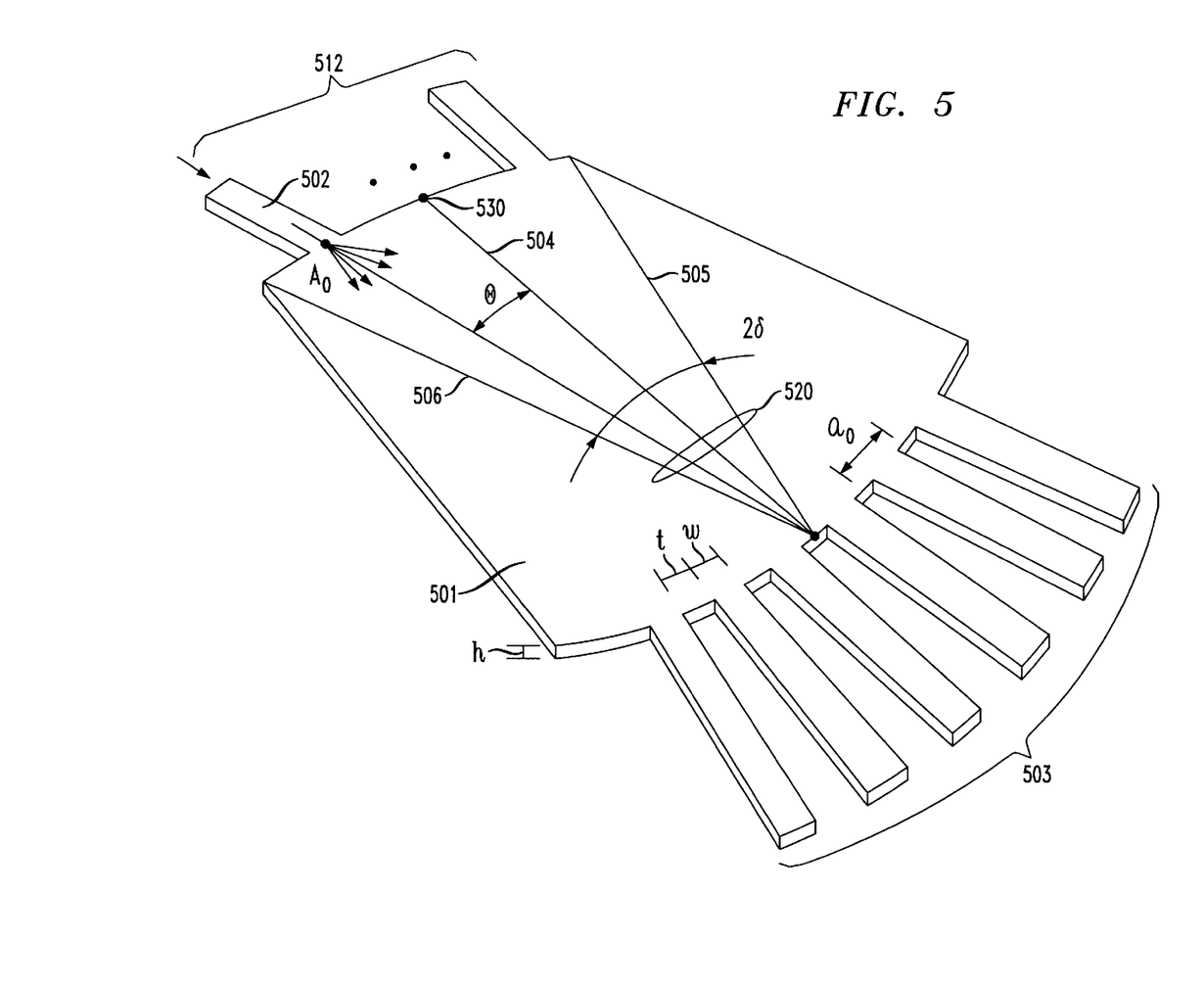
FIG. 5 shows a star coupler formed from an input slab, placed between a set of input waveguides and a receiving array.

FIG. 5 shows an illustrative star coupler including an input slab 501, placed between an input waveguide 502 and a receiving array 503. The receiving apertures of the array are arranged periodically, with spacing $a_0$. The array efficiency $\eta(\theta)$ is the fraction of the incident power that is accepted by the array, and transmitted to the arms of the router. A property of $\eta(\theta)$ is that it is a function of the angle $\theta$ specifying the input waveguide location. The angle $\theta$ is formed with the center line 504 of the central zone having boundaries 505 and 506. For an ideal array, $$\eta \cong \text{rect}(\theta/\gamma) \quad (1)$$

where $2\gamma$ is the angular width of the field of view, also called the central zone, [1–4] determined by the spacing $a_0$ and the wavelength $\lambda$, $$2\gamma = \frac{a_0}{\lambda} \quad (2)$$

Figure 6:
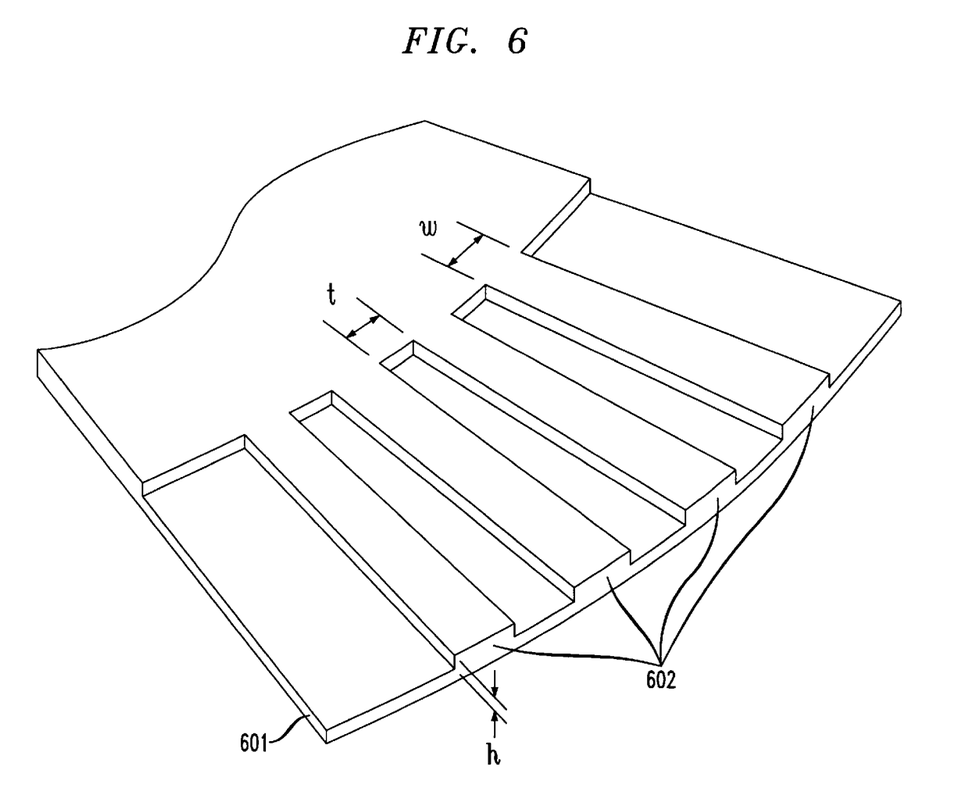
FIG. 6 shows a junction between an input slab and a receiving array formed on a substrate core layer.

According to [3], in a properly designed array, the efficiency $\eta$ is primarily determined by the quantity $$Q = 4\pi n \Delta n \left(\frac{a_0}{\lambda}\right)^2 \sin(t\pi/a_0) \quad (3)$$

where t is the gap between adjacent cores of the receiving apertures and $\Delta n$ is the effective refractive index difference. One can show that $\eta$ approaches, for small Q, the above rectangular distribution. However, this distribution is not approached uniformly over the entire central zone. For any particular $\theta$ inside the central zone, one finds that the efficiency $\eta$ can be made to be as close as desired to unity, by properly choosing Q, but the required values of Q become very small, if $\theta$ is close to the zone boundaries. Nevertheless, by choosing a small Q, it is possible to approximately produce the distribution (1) over most of the central zone. To this purpose the contrast $\Delta n$ is often reduced as shown in FIG. 6 by including an additional core layer 601, forming a slab of suitable thickness below the waveguide array 602. As previously described, this technique increases the device dimensions, since it requires smaller curvatures in the bends, and for this reason, the effective contrast $\Delta n$ is typically kept larger than 0.3%. Very small gaps t are also impractical, as pointed out earlier. As shown in reference [4], the smaller values of Q required in the vicinity of the boundaries, 505 and 506, of the central zone are primarily caused by Bragg reflections in the vicinity of the array 503 junction with the slab 501. These reflections primarily occur in the transition region where the waveguides are closely spaced and strongly coupled.

Notice that the array of FIG. 5 consists of identical cells, that is, where waveguide size w, gap t and spacing $a_0$ are the same for all cells. Each cell contains a waveguide and, in order for $\eta(\theta)$ to approach a rectangular distribution [3,4], each waveguide mode must efficiently illuminate the entire cell width $a_0$. For this reason, Bragg reflections were previously minimized by minimizing the gap t, so as to cause each waveguide to approximately fill the entire cell. I have recognized that the same result can be obtained by reducing, instead of increasing, the waveguide width $w=a_0-t$. In fact, from Eq. (3), one can see that Q is not affected by replacing t with $a_0-t$. This dual relationship between t and $a_0-t$ forms the basis for replacing the geometry of FIG. 6 with its dual geometry, shown in FIG. 8.

Figure 7:
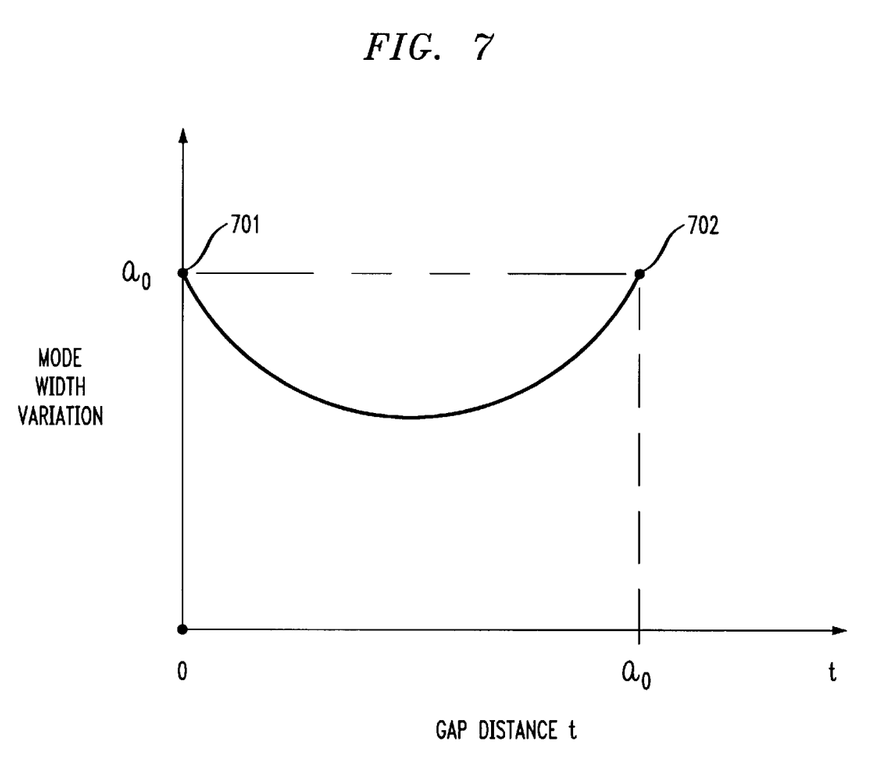
FIG. 7 shows an illustrative curve of the mode width variation with gap distance.

This result verifies my technique of reducing waveguide width w to improve efficiency $\eta$. This technique can be explained as follows. For an isolated waveguide of large enough width w, the evanescent field outside the waveguide core is negligible, and the entire mode is then produced, to a good approximation, inside the core. On the other hand, by reducing the waveguide width, the decay constant outside the core decreases and the evanescent field outside increases. As a consequence, the mode width increases with decreases in waveguide core width $w$,. One thus obtains for each cell the behavior sketched in FIG. 7, which shows the mode width variation as a function of gap t, obtained by including the effect of neighboring cells. The effective width is characterized by two maxima 701 and 702 separated by a minimum. One maximum 701, the one approached by minimizing the gap t, represents the design objective of prior art techniques. The other maximum 702, the one approached by minimizing $a_0-t$, represents the dual approach, considered here.

Figure 8A:
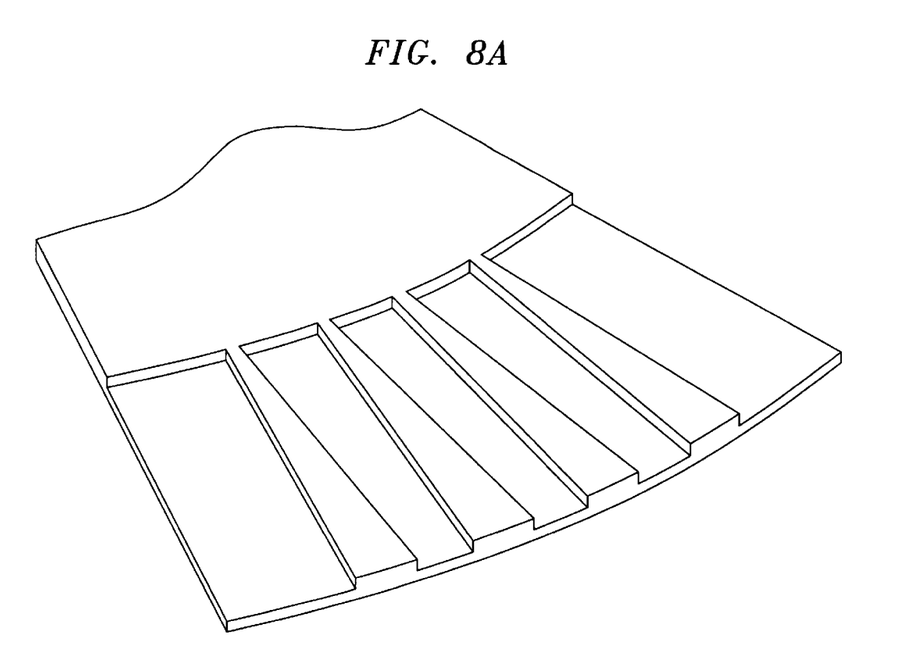
FIGS. 8a and 8b shows two ways of realizing a junction between a free-space region and an array. In both cases the arrangement can be derived from a slag of initial uniform thickness h, by reducing the thickness in certain areas. In the case of FIG. 8a, the thickness is only reduced between the waveguide cores whereas, in the case of FIG. 8b, it is also reduced in the free-space region. In either case the same arrangement can also be realized by first entirely removing the slab in the above areas, and then depositing over the entire wafer a flow layer of core material.

Thus, in accordance with the present invention, we reduce Bragg reflections by replacing the geometry of FIG. 6 with its dual geometry as shown in FIG. 8. In the transition region, instead of reducing the gap t between adjacent cores we increase t and, at the same time, we reduce the waveguides width w. The transition region design is similar in the two cases, and it can be carried out as discussed in reference [4]. One finds, if the transition region is very gradual, that the geometry of FIG. 6 is approximately equivalent to the dual geometry, and, essentially, the same $\eta(\theta)$ is obtained in the two cases, (for a given $a_0$ spacing) assuming that the final gap t in one case is equal to the final width w in the other.

We next apply the above technique to the arrangement of FIG. 5. In this case the waveguide width w cannot be reduced arbitrarily, for the following reason. We ignored so far the mode distribution in the plane orthogonal to the array. Ideally, we would like in this plane a perfect match between each waveguide and the slab. This is only possible, however, if the waveguide width w in the array plane is large, in which case the waveguide mode will be essentially characterized in the orthogonal plane by the same decay as the slab modes. On the other hand, by reducing the waveguide width, the mode decay outside the core will be reduced, and this will cause in the orthogonal plane a mismatch between array and slab. Thus, using my technique, as $\eta(\theta)$ approaches a rectangular distribution, a mismatch loss is produced in the plane orthogonal to the array. In order for this loss to be acceptable, the waveguide width must not be smaller than some minimum value determined by the largest loss that can be tolerated.

Consider for instance a typical example. Suppose initially the array is characterized by $\Delta n_0=0.65\%$, $h=6.5$ $\mu$m, and $t=3.5$ $\mu$m. By then choosing $w=6.5$ $\mu$m, the mode of each waveguide will approximately have circular cross-section, with diameter close to 6.5 $\mu$m. A strong decay will be produced in this case outside the waveguide core and there will therefore be negligible overlap between the modes of adjacent waveguides. On the other hand, by reducing the core width to 3.5 $\mu$m, the decay constant in the region between the waveguide cores will be substantially reduced, resulting in appreciable overlap between adjacent modes. This will substantially improve the flatness of the radiation pattern η(θ). At the same time, there will be some mismatch loss caused by the increased mode width in the orthogonal plane, but the loss can be shown to be small (hundreds of dB). On the other hand, if the waveguide core width is substantially reduced, so as to further improve the flatness of η(θ), one finds that this improvements will be accompanied by substantial increase in mode width in the orthogonal plane, thus causing a corresponding loss (i.e., a reduction of efficiency η(θ) ). For this reason, it may be advantageous to modify the arrangement as discussed next.

Figure 8B:
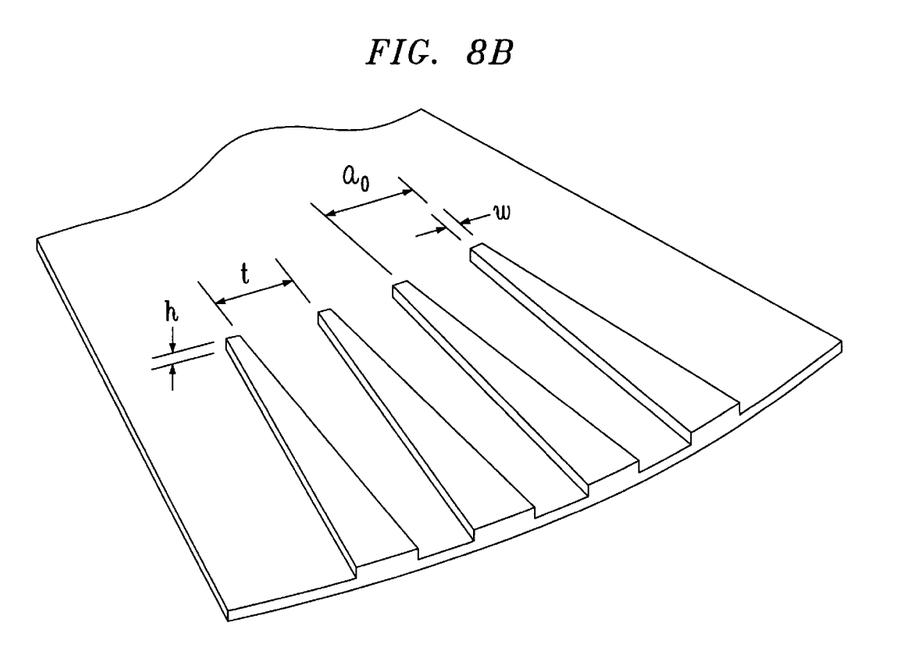

As discussed earlier, an additional core layer covering the entire wafer as in FIGS. 6 and 8 increases the device dimensions. This problem can be eliminated by only including the additional layer in certain regions, namely at the input and output slabs of FIG. 1 and their vicinity. Instead of the embodiment of FIG. 8b, we now obtain FIG. 9, consisting of a slab of variable thickness combined with an array of waveguides, which extend over the slab in the region close to the free-space region. Thus, now the array includes a transition region, in which the waveguides are combined with an additional core layer whose thickness is gradually tapered, between a maximum thickness produced at the junction and zero thickness produced in region 2 at some predetermined distance 907 (e.g., 1–3 mm) from the slab boundary or junction 906. This tapered additional layer 902 is deposited as described with reference to FIG. 10.

Figure 10:
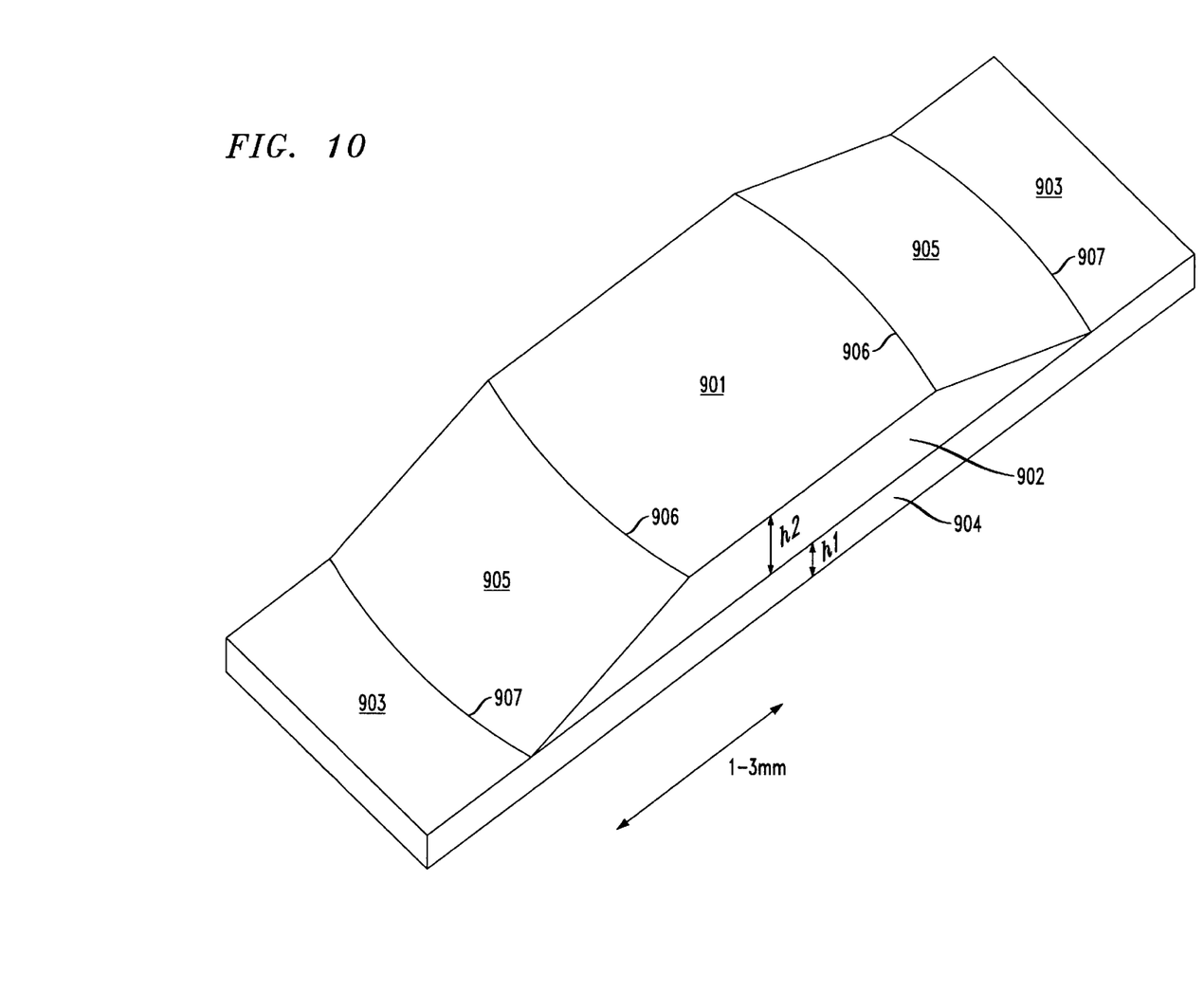
FIG. 10 shows, in accordance with the present invention, the core layer before the photolithography processes used to form the FIG. 9 embodiment.

As shown in FIG. 10, the core before photolithography consists of two layers, one covering the entire wafer 904, and, the other 902, covering only the above slab 901 and transition region 905. As shown, the second layer 902 has a thickness h2 in slab region 901 and tapers from the slab/array junction 906 to zero at 907 at the edge of region 905. The two layers 902 and 904 need not have the same refractive index. Higher index is generally desirable for layer 904 used for the regions containing the bends whereas, for the second layer 902 covering the input and output slabs and their vicinity, a smaller contrast is desirable, in order to reduce the value of Q.

The core deposition, i.e., layers 904 and 902, must now proceed in two steps, for instance by using electron beam deposition. The first step must cover uniformly the entire wafer with layer 904 of thickness $h_1$ and relatively high refractive index. The second step must cover the slab region 901 and its vicinity (i.e., the transition region 905) with the layer 902, and it will be characterized in general by smaller refractive index. During deposition, in a well known manner, a shadow mask can be used to prevent deposition outside the above regions. At the boundaries 906 of these two regions 901 and 905, it is important to avoid discontinuities, by producing suitable transition regions in the vicinity of the boundaries. This can be accomplished by properly controlling the deposition conditions, for instance by varying the mask location during deposition or by using an extended source so as to produce, in the vicinity of the boundaries, transition regions (of a few millimeters) in which the layer thickness gradually varies from zero to the specified maximum value $h_2$, as shown in FIG. 10.

Figure 11:
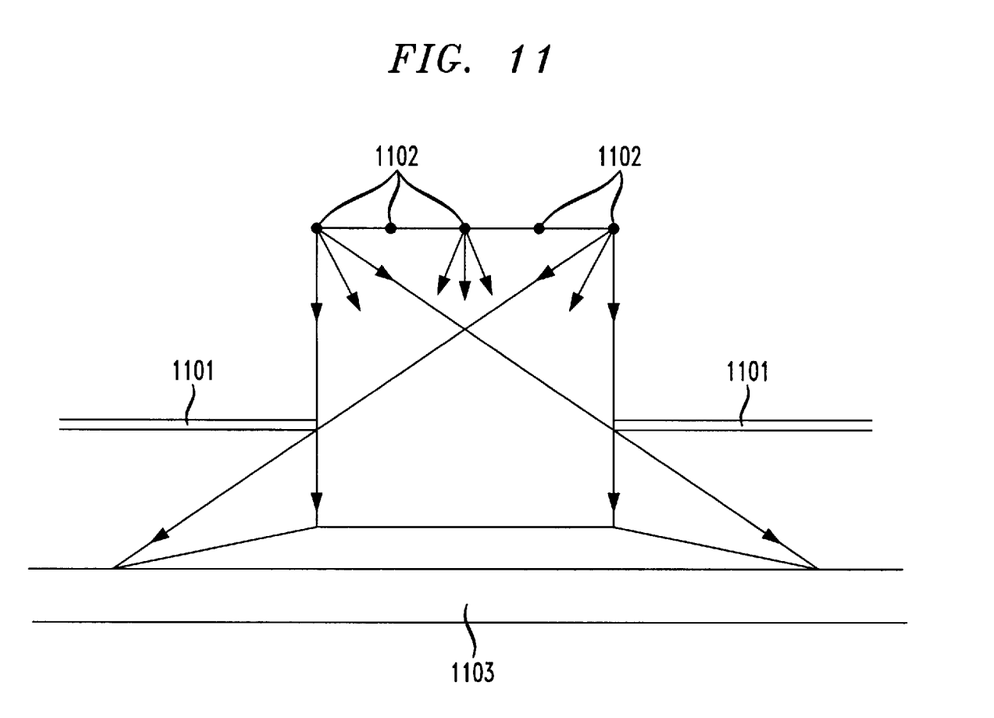
FIG. 11 shows an illustrative arrangement for producing the tapered layer of the core layer shown in FIG. 10.

Shown in FIG. 11 is an illustrative arrangement for producing the tapered layer of the core layer 902 shown in FIG. 10. An extended source 1102 is combined with a mask 1101, properly placed between source 1102 and wafer 1103, to produce a tapered layer thickness in the regions close to the edges. The layer thickness can also be controlled by varying the mask 1101 or source 1102 position during deposition.

Figure 9:
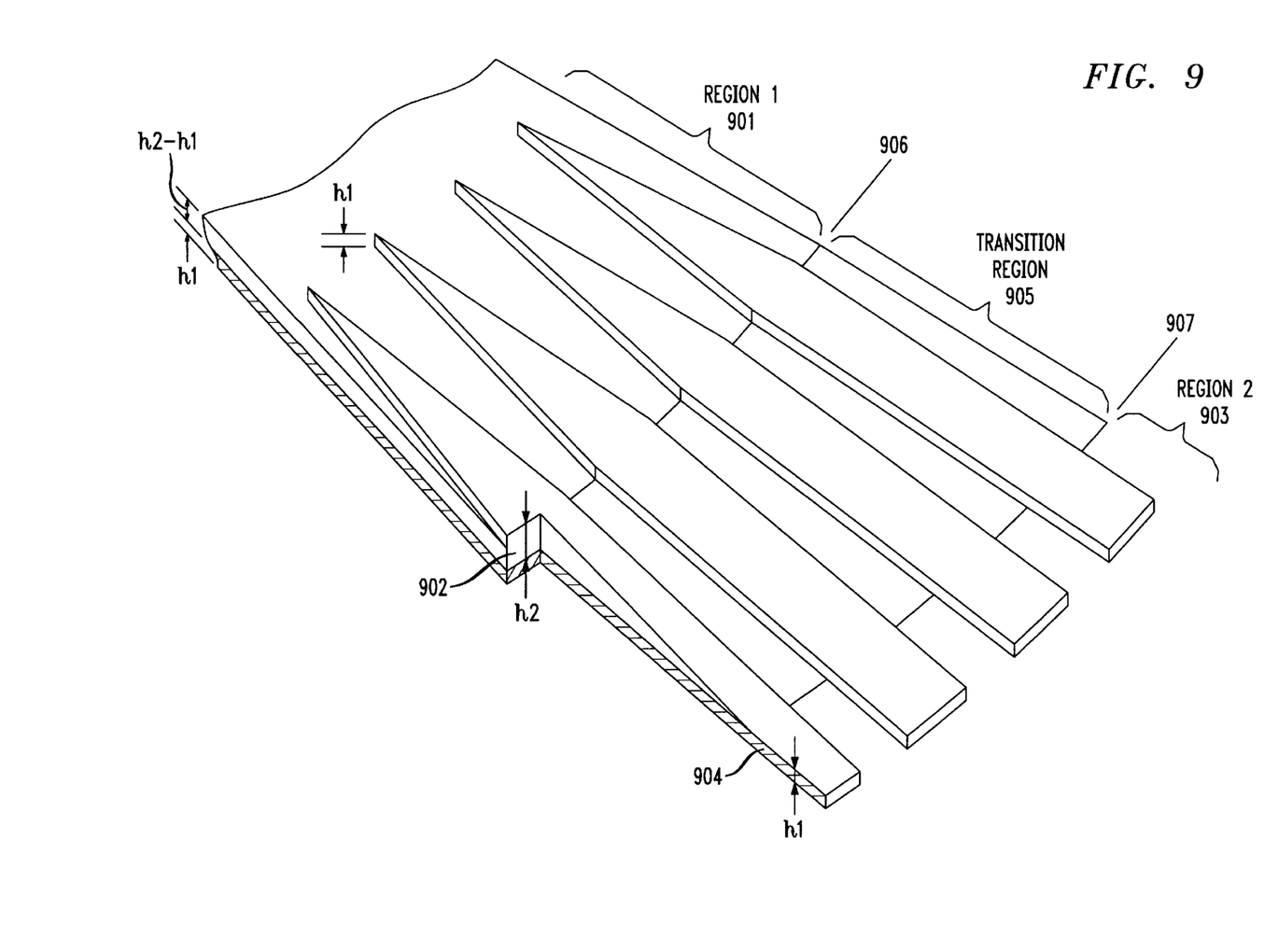
FIG. 9 shows an embodiment of an illustrative junction of an input slab to a reduced-width-tapered receiving array where the waveguides in the transition region are formed on a core layer of tapered thickness that is maximum at one end and it is zero at the other end.

After photolithography, one obtains the geometry shown in FIG. 9, where the effective refractive index is characterize by two regions with different contrasts, separated by an intermediate transition region 905 where the contrast gradually varies between a maximum value, produced in region 903, and a smaller value, produced at the boundary of region 901.

What has been described is merely illustrative of the application of the principles of the present invention. Other arrangements and methods can be implemented by those skilled in the art without departing from the spirit and scope of the present invention.

APPENDIX

REFERENCES

1. C. Dragone, U.S. Pat. No. 5,136,671, issued on Aug. 4, 1992.
2. C. Dragone, "An N×N Optical Multiplexer Using a Planar Arrangement of Two Star Couplers", *IEEE Photon. Technol. Lett.*, pp. 812–815, September 1991.
3. C. Dragone, "Efficiency of a Periodic Array with Nearly Ideal Element Pattern", *IEEE Photon. Technol. Lett.*, Vol. 1, pp. 238–249, 1989.
4. C. Dragone, "Optimum Design of a Planar Array of Tapered Waveguides", *J. Opt. Soc. Amer. A.*, Vol. 7, No. 11, pp. 2081–2093, November 1990.
5. T. Tamir, "Integrated Optics" a book published by Spinger-Verlag.

What is claimed is:

1. An optical interconnection apparatus comprising a planar free-space region having an input side and an output side;

at least one input waveguide, radially connected to the input side of said free-space region, for directing optical signals to a plurality of output waveguides radially connected, at a junction, to the output side of said free-space region;

a transition region, extending radially from said junction along said plurality of output waveguides, where a coupling efficiency between said free-space region and said plurality of output waveguides is maximized by reducing the width of said plurality of output waveguides in the transition region close to said junction to be less than the width at distances farther away from said junction, and wherein the width, w, at said junction is smaller than the gaps, t, between adjacent ones of said plurality of output waveguides.

2. The optical interconnection apparatus of claim 1 wherein said plurality of output waveguides form a periodic array.

3. The optical interconnection apparatus of claim 1 wherein said width, w, is minimized by choosing the smallest value allowed by a fabrication process used to form said apparatus and a specified maximum loss for said apparatus.

4. The optical interconnection apparatus of claim 1 having a plurality of input waveguides connected to the input side of the free-space region and the difference between maximum and minimum loss respectively produced between marginal and central waveguides is minimized by properly selecting the width, w, without exceeding a specified maximum loss for the apparatus.

5. The optical interconnection apparatus of claim 1 wherein the ratio of said width, w, to a thickness, h, of said plurality of output waveguides is less than one.

6. The optical interconnection apparatus of claim 1 wherein the ratio of said width, w, to a gap, t, between adjacent cores of said plurality of output waveguides is less than one.

7. The optical interconnection apparatus of claim 1 being formed using a slab construction having a finite thickness in said free-space region and wherein the slab thickness tapers to about zero thickness in the area between said plurality of output waveguides at the end of said transition region.

8. The optical interconnection apparatus of claim 7 wherein the slab includes two layers of different refractive indexes.

9. The optical interconnection apparatus of claim 1 wherein said width of said plurality of output waveguides increases in the vicinity of said junction with radial distance from said junction.

10. The optical interconnection apparatus of claim 9 wherein said width increases linearly with radial distance from said junction.

11. The optical interconnection apparatus of claim 7 wherein said slab thickness tapers gradually to zero thickness in the area between said plurality of output waveguides.

12. The optical interconnection apparatus of claim 7 wherein the thickness of said free-space region tapers in the transition region so as to essentially eliminate any mismatch loss that would otherwise be caused in an abrupt junction of said plurality of output waveguide with said free-space region.

13. The optical interconnection apparatus of claim 1 including a plurality of input waveguides each of which can direct optical signals to said plurality of output waveguides so as to form a star coupler.

14. The optical interconnection apparatus of claim 13 including two of said star coupler connected together using a set of waveguides to form a wavelength router.

15. A method of making an optical interconnection apparatus comprising the steps of forming a planar free-space region having an input side and an output side;

forming at least one input waveguide, radially connected to the input side of said free-space region, for directing optical signals to a plurality of output waveguides radially connected, at a junction, to the output side of said free-space region;

forming a transition region, extending radially from said junction along said plurality of output waveguides, by reducing the width of said plurality of output waveguides in the transition region close to said junction to be less than the width at distances farther away from said junction, and wherein the width, w, at said junction is smaller than the gaps, t, between adjacent ones of said plurality of output waveguides.

16. The method of claim 15 wherein said apparatus is formed by the steps of first depositing a first layer of thickness $h_1$ on a wafer which is to include said apparatus and second depositing a second layer of thickness $h_2$ in said free-space region and tapering the thickness to zero at the end of said transition region.

17. The method of claim 16 wherein the first layer has a higher refractive index than the second layer.

18. The method of claim 16 wherein the second depositing step varies a position of a mask to taper the thickness of the second layer.

19. The method of claim 16 wherein the second depositing step uses an extended source to taper the thickness of the second layer.

* * * * *